(12) United States Patent
Kobayashi et al.

(10) Patent No.: US 7,897,284 B2
(45) Date of Patent: Mar. 1, 2011

(54) LITHIUM SECONDARY BATTERY

(75) Inventors: Kei Kobayashi, Kobe (JP); Hiromasa Yagi, Kobe (JP); Masaki Hirase, Kobe (JP); Daizo Jito, Kobe (JP); Katsunobu Sayama, Kobe (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1190 days.

(21) Appl. No.: 11/527,716

(22) Filed: Sep. 27, 2006

(65) Prior Publication Data

US 2007/0077494 A1    Apr. 5, 2007

(30) Foreign Application Priority Data

Sep. 29, 2005   (JP) .................... 2005-285281

(51) Int. Cl.
*H01M 4/02*   (2006.01)
*H01M 4/58*   (2006.01)
*H01M 4/62*   (2006.01)
*H01M 4/64*   (2006.01)
*H01M 4/66*   (2006.01)
*H01M 4/68*   (2006.01)
*H01M 4/72*   (2006.01)

(52) U.S. Cl. ............... 429/232; 429/209; 429/218.1; 429/233; 429/245

(58) Field of Classification Search ............ 429/217
See application file for complete search history.

(56) References Cited

U.S. PATENT DOCUMENTS

2003/0157407 A1 *  8/2003  Kosuzu et al. ......... 429/231.95

FOREIGN PATENT DOCUMENTS

| EP | 1231654 A1 * | 8/2002 |
|---|---|---|
| JP | 10-125355 A | 5/1998 |
| JP | 10-255768 A | 9/1998 |
| JP | 2001-266851 A | 9/2001 |
| JP | 2001-273892 A | 10/2001 |
| JP | 2003-26429 A | 1/2003 |

OTHER PUBLICATIONS

Machine translation of JP 10125355 A, Wakabayashi, May 1998.*
Machine translation of JP 2001273892, Fujimoto et al., Oct. 2001.*
Robert A. Huggins, "Lithium alloy negative electrodes formed from convertible oxides", Solid State Ionics, 113-115, p. 57-67 (1998).

* cited by examiner

*Primary Examiner* — Robert Hodge
*Assistant Examiner* — Sean P Cullen
(74) *Attorney, Agent, or Firm* — Westerman, Hattori, Daniels & Adrian, LLP (57) ABSTRACT

A lithium secondary battery is provided with a positive electrode, a negative electrode (1), a separator interposed between the positive and negative electrodes, and an electrode assembly having the negative electrode (1), the positive electrode, and the separator. The negative electrode (1) has a negative electrode current collector (11) and negative electrode active material layers (12), (13) formed on respective surfaces of the negative electrode current collector (11). The negative electrode active material layers are composed of an alloy containing silicon, which intercalates and deintercalates lithium, and iron, which does not intercalate or deintercalate lithium. At least a portion of the electrode assembly has a curved portion in which the negative electrode active material layer (13) disposed inward relative to the negative electrode current collector contains a higher concentration of the iron than the negative electrode active material layer (12) disposed outward relative to the negative electrode current collector.

15 Claims, 5 Drawing Sheets

LITHIUM SECONDARY BATTERY

BACKGROUND OF THE INVENTION

1. Field of the Invention

The present invention relates to lithium secondary batteries, and more particularly a lithium secondary battery having an electrode assembly provided with a curved portion.

2. Description of Related Art

Various mobile communication devices and mobile electronic devices such as laptop computers have emerged in recent years, and this has lead to a demand for higher capacity batteries as their driving power sources. Lithium secondary batteries, which perform charge and discharge by transferring lithium ions between the positive and negative electrodes, have been widely used as the driving power source for the mobile communication devices and the like since they have higher energy density and greater high capacity than other secondary batteries such as nickel-cadmium storage batteries. Nevertheless, as size and weight reductions in the mobile communication devices and other electronic devices advance, the demand for further improvements in energy density and cycle performance of lithium secondary batteries is expected to increase.

Currently, in common lithium secondary batteries, carbon materials represented by graphite are generally used as their negative electrode materials (negative electrode active materials). When using a negative electrode material composed of graphite, lithium intercalation is only possible up to the composition $LiC_6$, and the upper limit of battery capacity is limited to the theoretical capacity 372 mAh/g. This has been an obstacle to improvements in battery capacity.

In view of this problem, a lithium secondary battery employing aluminum, silicon, or tin that alloys with lithium as a negative electrode active material with a high energy density per weight and per volume is reported in Solid State Ionics, Vols. 113-115, p. 57 (1998). Among the materials, silicon shows a particularly high theoretical capacity and is therefore desirable as a negative electrode active material for high-capacity batteries, so various secondary batteries using silicon as negative electrode active material have been proposed (see, for example, Japanese Published Unexamined Patent Application No. 10-255768).

A problem with the negative electrode that uses this type of active material, however, has been that it undergoes considerable changes in volume during the charge-discharge process, and thereby stress develops between the negative electrode active material and the negative electrode current collector, eventually resulting in peel-off of the negative electrode active material and creases or warpage of the electrode.

In view of the problem, Japanese Published Unexamined Patent Application No. 2001-266851, for example, proposes a negative electrode for a lithium secondary battery has been proposed in which a microcrystalline thin film or an amorphous thin film of silicon or the like is formed on a negative electrode current collector made of, for example, a copper foil by a thin-film forming technique such as evaporation or sputtering. In the negative electrode of this type, the microcrystalline or amorphous thin film on the negative electrode current collector is provided with columnar structures, which serves to alleviate the stress due to the expansion and shrinkage of the negative electrode active material associated with the charge-discharge process and prevents the negative electrode active material from peeling off from the negative electrode current collector. Therefore, the charge-discharge cycle performance of the lithium secondary battery improves to a certain extent, but the improvement effect is still insufficient.

Japanese Published Unexamined Patent Application No. 2001-273892, for example, also proposes a lithium secondary battery that employs an electrode material made of, for example, a silicon alloy containing an active material that intercalates and deintercalates lithium, such as silicon, and an additive metal that does not intercalate or deintercalate lithium. The electrode for a lithium secondary battery of this type can alleviate the expansion and shrinkage associated with the charge-discharge process to a certain extent and can consequently reduce the stress due to because of the presence of the metal that does not intercalate or deintercalate lithium. Moreover, due to the presence of the metal that does not intercalate or deintercalate lithium, structural changes in the active material film associated with the charge-discharge process can be alleviated, and the peel-off of the active material due to the stress can be lessened to some extent.

Nevertheless, even the lithium secondary batteries fabricated through these manufacturing methods cannot reduce the stress associated with charge and discharge sufficiently, so that when the charge-discharge cycle is repeated over a long period of time, they still suffer from capacity degradation resulting from deformation of the negative electrode active material that occurs at early stage of charge-discharge cycling and creases and warpage of the negative electrode due to non-uniform plastic deformation of the negative electrode, which lead to the problem of cycle performance deterioration.

BRIEF SUMMARY OF THE INVENTION

Accordingly, it is an object of the present invention to provide a lithium secondary battery that is capable of minimizing the capacity degradation resulting from the deformation of the negative electrode active material that occurs at an early stage of charge-discharge cycling and creases and warpage that originate from non-uniform plastic deformation of the negative electrode, so that the charge-discharge cycle performance can be improved while the initial charge-discharge capacity prevented from degrading.

In order to accomplish the foregoing and other objects, the present invention provides a lithium secondary battery comprising: a positive electrode; a negative electrode comprising a negative electrode current collector and negative electrode active material layers formed on respective surfaces of the negative electrode current collector, one of the negative electrode active material layers disposed inward relative to the negative electrode current collector and the other one disposed outward relative to the negative electrode current collector and each of the negative electrode active material layers comprising an alloy containing a negative electrode active material that intercalates and deintercalates lithium and an additive metal that does not intercalate or deintercalate lithium; a separator interposed between the positive and negative electrodes; and an electrode assembly comprising the negative electrode, the positive electrode, and the separator, wherein: at least a portion of the electrode assembly has a curved portion, and in the curved portion, the inward negative electrode active material layer contains a higher concentration of the additive metal than the outward negative electrode active material layer.

DETAILED DESCRIPTION OF THE INVENTION

The lithium secondary battery according to the present invention is provided with a negative electrode, a positive electrode, a separator interposed between the positive and negative electrodes, and an electrode assembly comprising the negative electrode, the positive electrode, and the separator. The negative electrode comprises a negative electrode current collector and negative electrode active material layers formed on respective surfaces of the negative electrode current collector. One of the negative electrode active material layers is disposed inward relative to the negative electrode current collector and the other one is disposed outward relative to the negative electrode current collector. Each of the negative electrode active material layers comprises an alloy containing a negative electrode active material that intercalates and deintercalates lithium and an additive metal that does not intercalate or deintercalate lithium. At least a portion of the electrode assembly has a curved portion, and in the curved portion, the inward negative electrode active material layer contains a higher concentration of the additive metal than the outward negative electrode active material layer.

Figure 1:
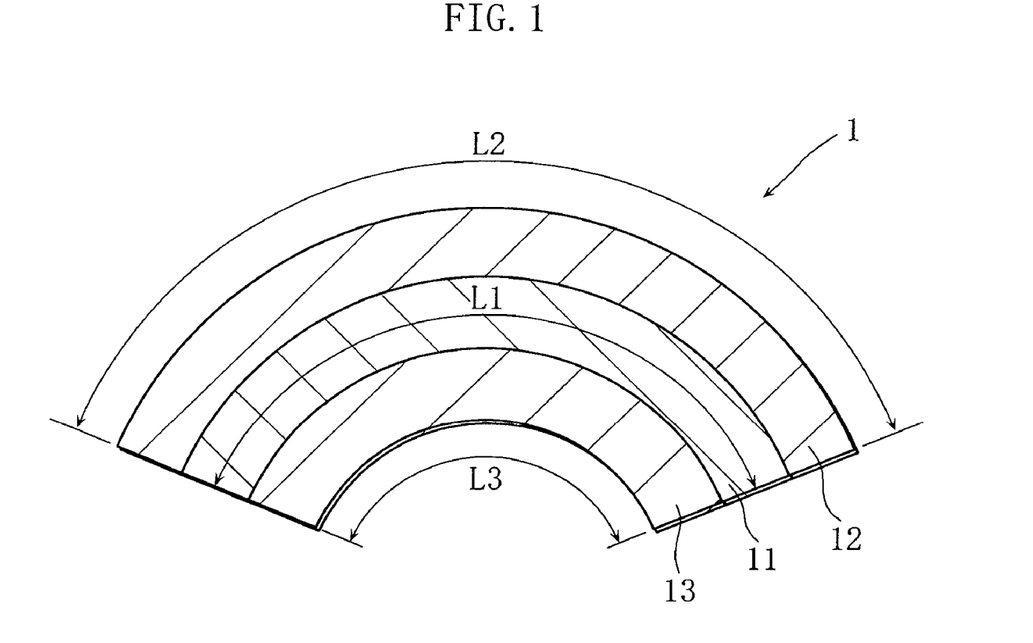
FIG. 1 is a cross-sectional view illustrating a portion of the negative electrode of one example of the lithium secondary battery according to the present invention.

The just-described construction makes it possible to reduce the stress to the negative electrode associated with the charge-discharge process and consequently to minimize the creases or warpage due to non-uniform plastic deformation of the negative electrode. Moreover, by reducing the stress, it can lessen the peel-off of the negative electrode active material. Therefore, the charge-discharge cycle performance can be improved. More specific details will be presented below taking a cylindrical lithium secondary battery as shown in FIG. 1 as an example. (FIG. 1 is a schematic view illustrating only a portion of the negative electrode in an early stage of the battery fabrication process). In FIG. 1, reference numeral 1 denotes a negative electrode. Reference numeral 11 denotes a negative electrode current collector. Reference numeral 12 denotes a negative electrode active material layer disposed outward relative to the negative electrode current collector 11 (which is also referred to as an outward negative electrode active material layer 12). Reference numeral 13 denotes a negative electrode active material layer disposed inward relative to the negative electrode current collector (which is also referred to as an inward negative electrode active material layer 13).

Referring to FIG. 1, in a cylindrical lithium secondary battery, length L2 of an outward negative electrode active material layer 12 is longer than length L1 of the negative electrode along substantially the center part thickness-wise (along substantially the center part of the negative electrode current collector thickness-wise), so the outward negative electrode active material layer 12 is elongated and tensile stress develops. On the other hand, length L3 of an inward negative electrode active material layer 13 is shorter, so the inward negative electrode active material layer 13 is compressed and compressive stress develops. As a result, the inward layer tends to have a greater density per unit volume of the negative electrode active material than the outward layer.

In a lithium secondary battery, when the battery is charged from the initial state (discharged state) as fabricated, the negative electrode active material intercalates lithium and thereby the negative electrode active material layers 12 and 13 expand in volume; on the other hand, when discharged from a charged state, the negative electrode active material deintercalates lithium and the negative electrode active material layers returns to the original volumes. Thus, when the battery is charged, the negative electrode active material layers 12 and 13 expand in volume, and therefore compressive stress acts on the negative electrode active material layers 12 and 13. In this case, the outward negative electrode active material layer 12 in a discharged state is under tensile stress as described above, so part of the tensile stress will be cancelled out by the expansion of the negative electrode active material layer 12 associated with the charging, and consequently the stress as a whole will be lessened. On the other hand, the inward negative electrode active material layer 13 in a discharged state is under compressive stress, so the stress to the inward negative electrode active material layer 13 will further increases when the negative electrode active material layer 12 expands because of the charging, and consequently the stress as a whole will also further increases.

As will be appreciated from above, the configuration in which each of the negative electrode active material layers contains an additive metal that does not intercalate or deintercalate lithium and the inward negative electrode active material layer has a concentration of the additive metal higher than the concentration of the additive metal in the outward negative electrode active material layer allows the expansion of the inward negative electrode active material layer resulting from charging to lessen. Therefore, the stress associated with charging can be alleviated in that negative electrode active material layer, and the peel-off of the negative electrode active material due to the stress can be minimized.

It should be noted that the term "concentration" herein is intended to mean the ratio of the number of atoms of the additive metal in each negative electrode active material layer to the number of the total atoms in each negative electrode active material layer.

It is desirable that the electrode assembly have a substantially circular cross-sectional shape.

In a battery in which the electrode assembly has a substantially circular cross-sectional shape, such as a cylindrical battery, the curved portion is provided over its entire circumference; therefore, the advantageous effects of the present invention will be exerted more evidently. In such a battery, the wound electrode assembly is in many cases placed in a battery can made of an inflexible material such as a metal. In such a case, the structural pressure tends to be greater, and the stress to the negative electrode during charge and discharge is accordingly greater. For this reason, the advantageous effects of the present invention are exhibited to a greater degree with such a battery.

It is desirable that the electrode assembly have a substantially rectangular cross-sectional shape both ends of which having curved portions.

In a battery in which the electrode assembly has a substantially rectangular cross-sectional shape both ends of which having curved portions, for example, in a prismatic battery, the operations and advantageous effects of the present invention are exhibited in the curved portions. In addition, in the case of such a battery, the wound electrode assembly is in many cases placed in a battery can made of an inflexible material such as a metal, so the advantageous effects of the present invention are exhibited to a greater degree as in the just-mentioned case.

It is desirable that the electrode assembly have a substantially elliptic cross-sectional shape.

In a battery in which the electrode assembly has a substantially elliptic cross-sectional shape, for example, in a thin-type battery such as a laminated battery, substantially the entire circumference forms the curved portion, and therefore, the advantageous effects of the present invention are exhibited evidently.

It is desirable that the additive metal be at least one metal selected from the group consisting of copper, nickel, iron, titanium, cobalt, molybdenum, tungsten, tantalum, and alloys thereof.

Although these are some examples of the additive metal, the additive metal in the present invention is by no means limited to these metals and alloys. Any metal or alloy is usable as long as it does not intercalate or deintercalate lithium.

It is preferable that the curved portion have a concentration difference of the additive metal of from 5 atomic % to 15 atomic % between the negative electrode active material layer disposed inward relative to the negative electrode current collector and the negative electrode active material layer disposed outward relative to the negative electrode current collector.

The reason is that if the concentration difference is less than 5 atomic %, the operations and advantageous effects resulting from the additive metal will not be sufficiently different between the inward negative electrode active material and the outward negative electrode active material so that the stress difference may not reduce sufficiently.

On the other hand, if the concentration difference exceeds 15 atomic %, the concentration of the additive metal will become inevitably high in the inward negative electrode active material layer even when the concentration of the additive metal is set low in the outward negative electrode active material layer, and thereby the charge-discharge capacity reduces. In addition, the effect of stress alleviation in the inward negative electrode active material layer will become too strong, and an adverse effect will occur that the difference between the stress to the inward negative electrode active material layer and the stress to the outward negative electrode active material layer rather widens.

It should be noted that when the radius of curvature of the curved portion is so large that the electrode is almost like a flat plate, the stress difference is so small between the inward negative electrode active material layer and the outward negative electrode active material layer that the effect of producing the concentration difference between the inward and outward negative electrode active material layers will accordingly reduce. For this reason, when the 5 atomic % to 15 atomic % difference in the additive metal concentration is provided between the outward and inward negative electrode active material layers, that difference is applied to a portion in which the radius of curvature of the electrode is 8 mm or less.

In the outward negative electrode active material layer and the inward negative electrode active material layer, when the concentration of the additive metal in the inward negative electrode active material layer is increased, the capacity per unit volume of that negative electrode active material layer reduces correspondingly. Accordingly, in order to prevent a large difference in the charge-discharge capacity between the outward layer and the inward layer, the thickness of the inward negative electrode active material layer should be made large, in other words, the volume of the inward negative electrode active material layer should be increased.

Further, when the thickness of the inward negative electrode active material is made large, the amounts of expansion and shrinkage of the inward negative electrode active material as a whole will increase, but this does not exacerbate the peel-off of the negative electrode active material from the negative electrode current collector. The reason is as follows. The peel-off of the negative electrode active material from the negative electrode current collector mainly takes place at the interface between the negative electrode current collector and the negative electrode active material layers. Meanwhile, the amounts of expansion and shrinkage per unit volume of negative electrode active material is determined by the density of the negative electrode active material, and the stress within the negative electrode active material is also determined by the density. Accordingly, even if the thickness of the negative electrode active material is made large, the stress at the interface between the negative electrode current collector and the negative electrode active material layer will not change. It should be noted that if the concentration difference of the additive metal between the two negative electrode active material layers is set to be large to a certain degree in the just-described case, it is recommended that the thickness increase in the inward negative electrode active material layer be made large, while if the concentration difference of the additive metal between the two negative electrode active material layers is set to be not so large, it is recommended that the thickness increase in the inward negative electrode active material layer not be so large.

It should be mentioned that Japanese Published Unexamined Patent Application No. 10-125355 makes a proposal to provide a charge-discharge capacity difference between the outward layer and the inward layer, for example, by making the thickness of the inward negative electrode active material layer smaller than the thickness of the outward negative electrode active material layer, or by making the density of the negative electrode active material in the inward negative electrode active material layer smaller than the density of the negative electrode active material of the outward negative electrode active material layer. However, as already discussed, even if the thickness of the inward negative electrode active material layer is reduced, the stress at the interface between the negative electrode current collector and the negative electrode active material layer will not lessen, and the peel-off of the negative electrode active material will occur. Likewise, even if the density of the negative electrode active material in the inward negative electrode active material layer is reduced, the strength of the negative electrode active material degrades, and the problem of the peel-off of the negative electrode active material still remain unsolved. Thus, it should be noted that the technique described in JP 10-125355A cannot achieve the operations and advantageous effects attained by the present invention.

It is desirable that the concentrations of the additive metal in the negative electrode active material layers be in a range of from 6 atomic % to 26 atomic %.

If the concentrations of the additive metal in the two negative electrode active material layers exceed 26 atomic %, the charge-discharge capacity per unit volume will reduce since the concentration of the additive metal that does not intercalate or deintercalate lithium is too high, degrading the energy density of the battery. On the other hand, if the concentrations of the additive metal in the two negative electrode active material layers are less than 6 atomic %, the effect of reducing the stress (particularly the effect of reducing the stress by the inward negative electrode active material layer) will be small, and the cycle performance may deteriorate because of the peel-off of the negative electrode active material, for example.

It is desirable that the negative electrode active material contain silicon as its main component.

When the negative electrode active material contains silicon as its main component as mentioned above, the advantageous effects obtained by the invention will be more significant than when using other negative electrode active materials such as carbon materials because the silicon active material undergoes greater expansion and shrinkage associated with the charge-discharge process than other active materials such as carbon materials. Moreover, since silicon has a high theoretical capacity, it becomes possible to increase the charge-discharge capacity of the battery.

The negative electrode active material in the present invention is not limited to silicon but may be any material that can intercalate and deintercalate lithium by being alloyed with lithium. Examples of such materials for negative electrode active material include germanium, tin, lead, zinc, magnesium, sodium, aluminum, potassium, and indium.

It should be noted that the phrase "the negative electrode active material contains silicon as its main component" is intended to mean that the negative electrode active material contains 50 atomic % or more silicon.

It is desirable that each of the negative electrode active material layers comprise a microcrystalline thin film or an amorphous thin film.

When the negative electrode active material layer comprises a microcrystalline thin film or an amorphous thin film as described above, the stress due to the expansion and shrinkage of the negative electrode active material associated with the charge-discharge process can be alleviated since the microcrystalline or amorphous thin film on the negative electrode current collector comprises columnar structures.

It is desirable that each of the negative electrode active material layers be divided by gaps that form along its thickness to form columnar structures, and bottom portions of the columnar structures be in close contact with the negative electrode current collector.

When the bottom portions of the columnar structures are in close contact with the negative electrode current collector, the peel-off of the negative electrode active material can be prevented more effectively even if stress is applied the negative electrode active material.

It is desirable that the negative electrode active material layers be formed by evaporation, sputtering, CVD, or thermal spraying.

The negative electrode active material layers having the configuration as described above may be easily fabricated by the above-listed techniques such as evaporation. Among them, it is preferable that the negative electrode active material layers be fabricated using evaporation or sputtering, which achieves high productivity. It should be noted that the method for forming the negative electrode active material layers in the present invention is by no means limited to these methods.

It is desirable that the surfaces of the negative electrode current collector on which the negative electrode active material layers are formed have been roughened.

When the surfaces of the negative electrode current collector on which the negative electrode active material layers are formed have been roughened as described above, adhesion between the negative electrode current collector and the negative electrode active material layers is improved and the stress alleviated.

It is desirable that the negative electrode current collector be roughed by plating, vapor deposition, etching, or polishing.

Although examples of the techniques used for roughening the negative electrode current collector include plating, vapor deposition technique, etching, and polishing, the techniques for roughening that may be used in present invention are not limited to these examples. Plating and vapor deposition are techniques in which a surface of a substrate made of a copper foil or a copper alloy foil is roughened by forming a thin film layer with irregularities on the substrate surface. Examples of the plating include electroplating and electroless plating. Examples of the vapor deposition include sputtering, chemical vapor deposition (CVD), and evaporation.

It is desirable that the negative electrode current collector be made of a copper foil or a copper alloy foil, and the negative electrode current collector is roughed by a plating technique using a plating bath containing copper as its main component.

The reason why the negative electrode current collector is preferably made of a copper foil or a copper alloy foil as described above is that these materials are low in cost and also capable of existing stably in the battery. In addition, the reason why plating is used as the technique for roughening is that the use of plating allows particulate copper and the like to adhere onto the surfaces of the negative electrode current collector and makes the shapes of the irregularities distinct, improving the adhesion of the negative electrode active material layers to the negative electrode current collector further.

When the current collector surfaces are roughened by electroplating, the roughening technique commonly used for the copper foil for printed circuit boards such as disclosed in Japanese Published Examined Patent Application No. 53-39376B may be suitably used. In the just-mentioned method, granular copper is formed by what is called "burn plating" and thereafter what is called "covering plating" is performed over the granular copper layer so that the resultant irregular shapes will not be damaged, to deposit a substantially flat and smooth plated layer, whereby the granular copper is roughed as what is called "nodular copper."

The just-mentioned copper alloy is not particularly limited as long as the alloy contains copper. Examples include Cu—Ag alloys as well as Cu—Te, Cu—Mg, Cu—Sn, Cu—Si, Cu—Mn, Cu—Be—Co, Cu—Ti, Cu—Ni—Si, Cu—Cr, Cu—Zr, Cu—Fe, Cu—Al, Cu—Zn, and Cu—Co-based alloys.

It is desirable that the surfaces of the negative electrode current collector on which the negative electrode active material layers are formed have a surface roughness Ra of 0.01 μm to 2 μm.

If the surface roughness Ra is less than 0.01 μm, the effect of the roughening process will not be sufficiently exhibited. On the other hand, if the surface roughness Ra exceeds 2 μm, the thickness of the negative electrode current collector will be too large, reducing the filling amount of the active material, and the volume energy density of the battery will degrade.

Surface roughness Ra is defined in Japanese Industrial Standards (JIS B 0601-1994) and can be measured by a surface roughness meter, for example.

It is desirable that the negative electrode current collector be made of a foil containing a heat-resistant copper alloy.

When the negative electrode current collector is made of a foil containing a heat-resistant copper alloy as described above, it is made possible to minimize degradation in mechanical strength of the negative electrode current collector, which is due to temperature variations during the formation of the negative electrode active material layers, and consequently to prevent the processing of the electrode in assembling the battery from becoming difficult. In addition, degradation of conductivity in the negative electrode current collector can be minimized.

Herein, the heat-resistant copper alloy refers to a copper alloy that has a tensile strength of 300 MPa or greater after annealed at 200° C. for 1 hour. Examples of the heat-resistant copper alloy are shown in Table 1 below.

TABLE 1

| Alloy | Composition |
|---|---|
| Tin-containing copper | Copper with 0.05-0.2% tin and 0.04% or less phosphorus added |
| Silver-containing copper | Copper with 0.08-0.25% silver added |
| Zirconium copper | Copper with 0.02-0.2% zirconium added |
| Chromium copper | Copper with 0.4-1.2% chromium added |
| Titanium copper | Copper with 1.0-4.0% titanium added |
| Beryllium copper | Copper with 0.4-2.2% beryllium and trace amounts of cobalt, nickel, and iron added |
| Iron-containing copper | Copper with 0.1-2.6% iron and 0.01-0.3% phosphorus added |
| High strength brass | Brass containing 55.0-60.5% copper, with 2.0% or less aluminum, 3.0% or less manganese, and 1.5% or less iron added |
| Tin-containing brass | 80.0-95.0% copper, 1.5-3.5% tin, and the rest being zinc |
| Phosphor bronze | Copper being the main component, containing 3.5-9.0% tin, and 0.03-0.35% phosphorus |
| Aluminum bronze | 77.0-92.5% copper, 6.0-12.0% aluminum, 1.5-6.0% iron, 7.0% or less nickel, and 2.0% or less manganese |
| Cupro-nickel | Copper being the main component, containing 9.0-33.0% nickel, 0.40-2.3% iron, 0.20-2.5% manganese, and 1.0% or less zinc |
| Corson alloy | Copper containing 3% nickel, 0.65% silicon, and 0.15% magnesium |
| Cr—Zr copper alloy | Copper containing 0.2% chromium, 0.1% zirconium, and 0.2% zinc |

As discussed above, the present invention makes it possible to minimize the capacity degradation associated with the charge-discharge cycle process, and prevent the deformation of the electrode such as creases and warpage associated with the charge-discharge process. Therefore, the charge-discharge cycle performance can be improved and moreover degradation in volume energy density can be minimized.

Hereinbelow, the present invention is described in further detail based on preferred embodiments thereof. It should be construed, however, that the present invention is not limited to the following preferred embodiments but various changes and modifications are possible without departing from the scope of the invention.

Example 1

Preparation of Negative Electrode

Figure 2:
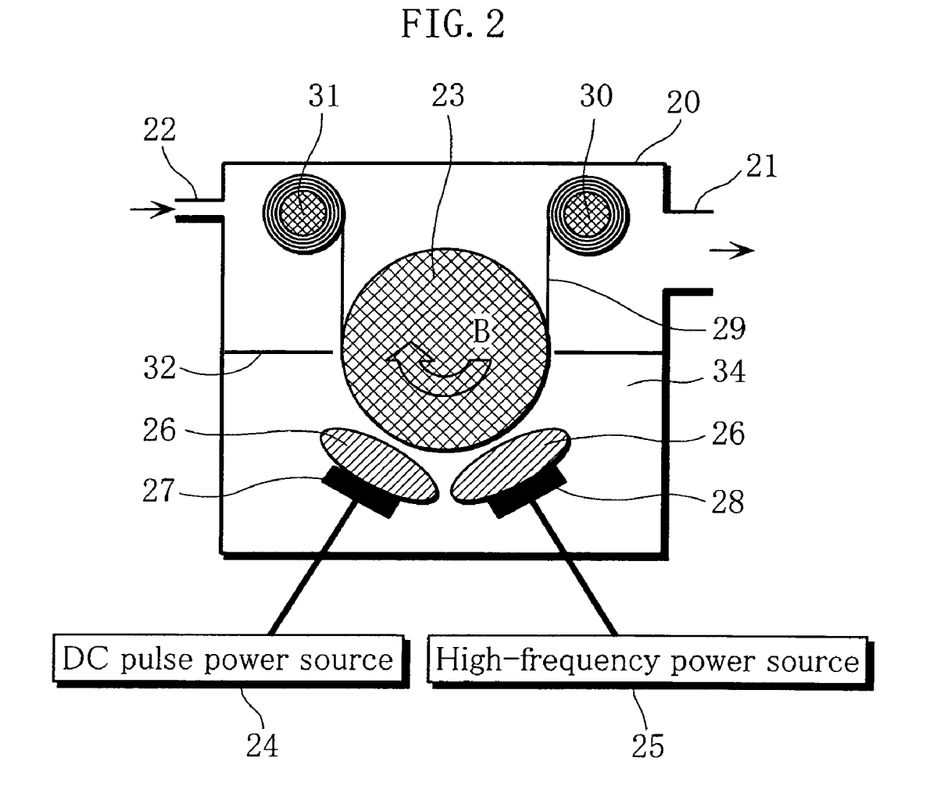
FIG. 2 is a schematic view illustrating a sputtering apparatus.

First, copper was deposited on a surface of a rolled copper foil by the previously-mentioned burn plating technique, to prepare a negative electrode current collector of a roughened copper rolled foil (surface roughness Ra: 0.47 µm, thickness: 18 µm) having irregularities on its surfaces. Thereafter, an amorphous thin film was deposited on both surfaces of the negative electrode current collector using a sputtering apparatus as shown in FIG. 2.

The sputtering apparatus has a chamber 20, which is connected to an exhaust passage 21 and an argon gas introduction passage 22. The exhaust passage 21 is connected to a vacuum pump (not shown), and the argon gas introduction passage 22 is connected to an argon gas cylinder (not shown). In the chamber 20, a roller 23 that is driven by a motor (not shown) are provided, and an iron sputtering source 28 electrically connected to a high-frequency power source 25 and a silicon sputtering source 27 electrically connected to a DC pulse power source 24 are disposed at locations facing the roller 23.

As the roller 23 rotates clockwise (in the direction indicated by arrow B in the drawing), the negative electrode current collector 29 is conveyed from a roller 30 to the rollers 31 so that a negative electrode active material layer (amorphous thin film) in which silicon and iron are mixed together is formed on one side of the negative electrode current collector 29. In FIG. 2, reference numeral 26 denotes plasma, reference numeral 32 denotes a shielding plate that divides the interior of the chamber 20, and reference numeral 34 denotes a deposition chamber.

Using the sputtering apparatus described above, film deposition (formation of the negative electrode active material layers) was conducted according to the following procedure.

First, the vacuum pump was actuated to evacuate the interior of the chamber 20 to $1 \times 10^{-4}$ Pa. Thereafter, argon was introduced into the chamber 20 through the argon gas introduction passage 22 and the gas pressure was stabilized. At the time when the gas pressure became stable at $2.5 \times 10^{-1}$ Pa, an electric power of 2000 W was supplied from the direct current pulse power source to the silicon sputtering source and an electric power of 225 W was supplied from the high-frequency power source to the iron sputtering source, while the roller 23 was being driven by the motor. Thereby, on one surface (the surface that would later become the outward layer in assembling the battery) of the negative electrode current collector 29, a negative electrode active material layer was formed (an amorphous thin film was deposited) in which iron, serving as an additive metal that does not intercalate or deintercalate additive metal, was mixed with silicon, serving as a negative electrode active material that intercalates and deintercalates lithium. The duration from the time at which the negative electrode current collector 29 supplied from the roller 30 passes the shielding plate 32 until the time at which it again passes the shielding plate 32 (the duration in which the negative electrode current collector 29 was in the deposition chamber 34, in other words, the deposition duration of the negative electrode active material layer) was set at 163 minutes.

Thereafter, a negative electrode active material layer in which iron and silicon were mixed together was formed on the other surface (the surface that would later become the inward layer after assembling the battery) of the negative electrode current collector 29 in the same manner as the foregoing. At this time, the electric power supplied from the high-frequency power source was set at 365 W so that the surface that would later become the inward layer would have an iron density higher than that in the surface that would later become the outward layer.

When the iron concentration in the negative electrode active material layer is varied as described above, the amount of lithium that is intercalated and deintercalated per unit volume varies. For example, when the iron concentration in the negative electrode active material layer is higher, the amount of lithium that is intercalated and deintercalated per unit volume reduces. For this reason, test batteries using lithium metal counter electrodes were prepared in advance and the film thicknesses of the two negative electrode active material layers were adjusted so that the amount of lithium intercalated and deintercalated per unit area of the negative electrode would be the same in the inward layer and the outward layer when the charging and discharging were performed with the potential versus metallic lithium being in the range of from 0 V to 2 V. Specifically, the deposition duration for the inward negative electrode active material layer was set at 177 minutes so that it would be longer than the deposition duration for the outward negative electrode active material layer. It should be noted that the relationship between high-frequency power and iron concentration in the formed negative electrode active material layers was determined by an X-ray fluorescence analysis. The details of the film deposition conditions are shown in Table 2.

The negative electrode active material layers thus obtained were cut out together with the negative electrode current collector into a 380 mm×52 mm rectangular shape, to thus form a negative electrode.

electrode mixture slurry. The resultant positive electrode mixture slurry was applied onto an aluminum foil serving as a current collector. The resultant material was dried and pressure-rolled, and then cut into a 402 mm×50 mm rectangular shape. Thus, a positive electrode was prepared.

Preparation of Non-Aqueous Electrolyte $LiPF_6$ was dissolved at a concentration of 1 mol/L into a mixed solvent of 3:7 volume ratio of ethylene carbonate (EC) and diethyl carbonate (DEC). Thereafter, carbon dioxide was blown into the resultant for 30 minutes to dissolve carbon dioxide therein, to thus prepare a non-aqueous electrolyte. The amount of the carbon dioxide dissolved in the non-aqueous electrolyte was found to be 0.40 mass % by gravimetric analysis.

Preparation of Lithium Secondary Battery

A microporous polyethylene separator was sandwiched between the positive electrode and the negative electrode prepared in the above-described manner. The resultant was spirally coiled to form a wound electrode assembly. Thereafter, the wound electrode assembly and the above-described non-aqueous electrolyte were placed in an aluminum laminate battery case under an argon atmosphere at room temperature and at atmospheric pressure. Thus, a lithium secondary battery was prepared.

Figure 3:
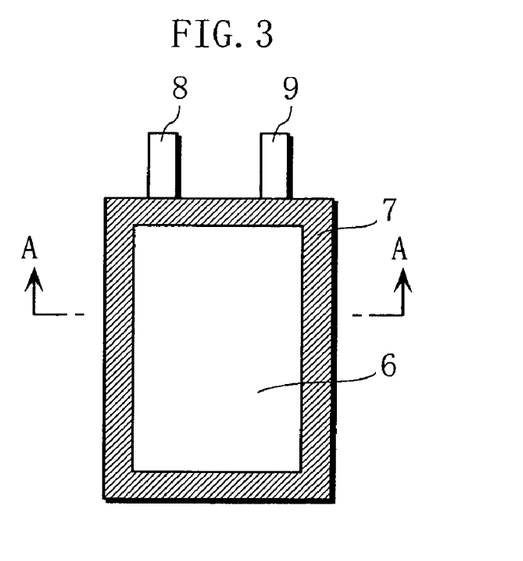
FIG. 3 is a front view showing a battery of the invention.
Figure 4:
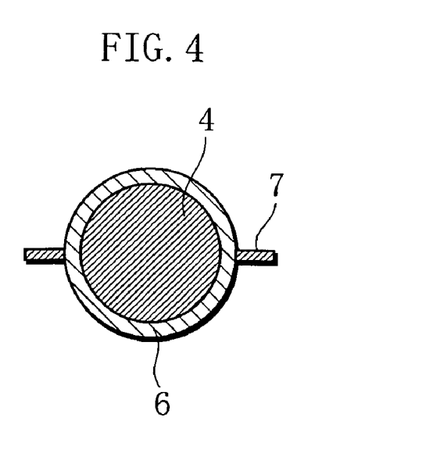
FIG. 4 is a cross-sectional view taken along line A-A in FIG. 3.
Figure 5:
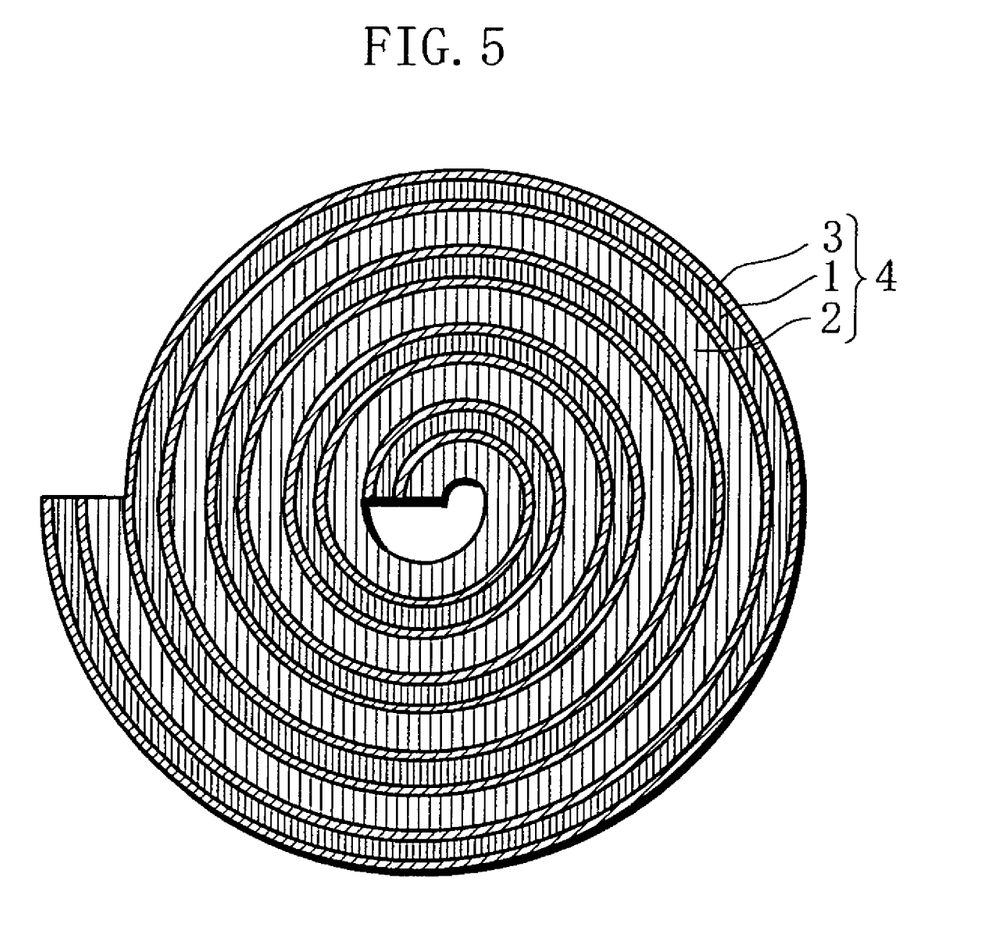
FIG. 5 is a cross-sectional view illustrating one example of the electrode assembly.

The specific structure of the just-described lithium secondary battery will be detailed below with reference to FIGS. 3 to 5. FIG. 3 is a front view of the lithium secondary battery thus prepared. FIG. 4 is a cross-sectional view taken along line A-A in FIG. 3. FIG. 5 is an enlarged cross-sectional view of the wound electrode assembly.

As illustrated in FIGS. 3 to 5, the wound electrode assembly 4, which comprises the positive electrode 2, the negative electrode 1, and the separator, is disposed inside the space of the aluminum laminate battery case 6 provided with a sealed part 7 at which opposing peripheral ends of the aluminum

TABLE 2

| Conditions in forming negative electrode active material layer | Silicon sputtering source | DC pulse frequency (kHz) | | 100 |
|---|---|---|---|---|
| | | DC pulse width (ns) | | 1856 |
| | | DC pulse power | | 2000 |
| | Iron sputtering source | High frequency (MHz) | | 13.56 |
| | | High frequency power (W) | For outward layer | 225 |
| | | | For inward layer | 365 |
| | | Argon flow rate (sccm) | | 65 |
| | | Gas pressure (Pa) | | $2.5 \times 10^{-1}$ |
| | | Deposition duration (min.) | For outward layer | 163 |
| | | | For inward layer | 177 |
| Negative electrode active material layer formed | | Film thickness (μm) | Outward layer | 5.8 |
| | | | Inward layer | 6.5 |
| | | | Thickness difference | 0.7 |
| | | Fe concentration (at. %) | Outward layer | 13.5 |
| | | | Inward layer | 18.5 |
| | | | Thickness difference | 5 |

Preparation of Positive Electrode $Li_2CO_3$ and $CoCO_3$ were used as starting materials. The materials were weighed so that the atomic ratio of Li:Co was 1:1, followed by mixing them in a mortar. The resultant mixture was pressure-formed by pressing it with a stamping die with a diameter of 17 mm, and then baked at 800° C. in the air for 24 hours, to thus obtain a baked material of $LiCoO_2$. The baked material was then pulverized in a mortar to form a powder with an average particle size of 20 μm.

Subsequently, 94 parts by mass of the resultant $LiCoO_2$ powder was mixed with a 5 mass % N-methyl pyrrolidone solution containing 3 parts by mass of artificial graphite powder as a conductive agent and 3 parts by mass of polyvinylidene fluoride as a binder agent, to thus prepare a positive laminate were heat sealed. A positive electrode current collector tab 7 made of aluminum and a negative electrode current collector tab 8 made of nickel are disposed protruding outwardly, thus forming a structure capable of charging and discharging as a secondary battery.

The diameter of the wound electrode assembly 4 was 16 mm, which means that the radius of curvature of the electrode was 8 mm or less.

The negative electrode and the battery prepared in the foregoing manner are hereinafter referred to as Negative Electrode a1 of the invention and Battery A1 of the invention, respectively.

Example 2

A negative electrode and a battery were fabricated in the same manner as in Example 1 above, except that the negative electrode active material layers were prepared according to the following conditions. As set out in Table 3 below, when forming the outward negative electrode active material layer (hereinafter also referred to simply as "the outward layer), the electric power supplied to iron sputtering source was set at 165 W and the deposition duration was set at 159 minutes. When forming the inward negative electrode active material layer (hereinafter also referred to simply as "the inward layer), the supplied electric power to the iron sputtering source was set at 450 W and the deposition duration was set at 186 minutes.

In the present Example 2, the total amount of the iron in the negative electrode active material layers formed on both surfaces of the negative electrode current collector was adjusted to be the same as that in the foregoing Example 1. It should be noted that in Examples 3 and 4 as well as Comparative Example below too, the total amount of the iron in the negative electrode active material layers formed on both surfaces of the negative electrode current collector was adjusted to be the same as that in the foregoing Example 1.

The negative electrode and the battery prepared in the foregoing manner are hereinafter referred to as Negative Electrode a2 of the invention and Battery A2 of the invention, respectively.

Example 3

A negative electrode and a battery were fabricated in the same manner as in Example 1 above, except that the negative electrode active material layers were prepared according to the following conditions. As set out in Table 3 below, when forming the outward layer, the electric power supplied to iron sputtering source was set at 115 W and the deposition duration was set at 155 minutes. When forming the inward layer, the supplied electric power to the iron sputtering source was set at 540 W and the deposition duration was set at 198 minutes.

The negative electrode and the battery prepared in the foregoing manner are hereinafter referred to as Negative Electrode a3 of the invention and Battery A3 of the invention, respectively.

Example 4

A negative electrode and a battery were fabricated in the same manner as in Example 1 above, except that the negative electrode active material layers were prepared according to the following conditions. As set out in Table 3 below, when forming the outward layer, the electric power supplied to iron sputtering source was set at 70 W and the deposition duration was set at 153 minutes. When forming the inward layer, the supplied electric power to the iron sputtering source was set at 640 W and the deposition duration was set at 214 minutes.

The negative electrode and the battery prepared in the foregoing manner are hereinafter referred to as Negative Electrode a3 of the invention and Battery A3 of the invention, respectively.

Comparative Example

A negative electrode and a battery were fabricated in the same manner as in Example 1 above, except that, as set out in Table 3 below, the electric power supplied to iron sputtering source was set at 300 W and the deposition duration was set at 165 minutes both when forming the outward layer and when forming the inward layer.

The negative electrode and the battery prepared in the foregoing manner are hereinafter referred to as Comparative Negative Electrode x and Comparative Battery X, respectively.

Conditions in Forming the Negative Electrode Active Material Layers and Details of the Negative Electrode Active Material Layers Table 3 shows the detailed conditions in forming the negative electrode active material layers for Negative Electrodes a1 to a4 of the invention and Comparative Negative Electrode x, as well as the details of the resultant negative electrode active material layers (film thickness and Fe concentration).

TABLE 3

| Negative electrode | | | | a1 | a2 | a3 | a4 | z |
|---|---|---|---|---|---|---|---|---|
| Conditions in forming negative electrode active material layers | Silicon sputtering source | DC pulse frequency (kHz) | | 100 | 100 | 100 | 100 | 100 |
| | | DC pulse width (ns) | | 1856 | 1856 | 1856 | 1856 | 1856 |
| | | DC pulse power | | 2000 | 2000 | 2000 | 2000 | 2000 |
| | Iron sputtering source | High frequency (MHz) | | 13.56 | 13.56 | 13.56 | 13.56 | 13.56 |
| | | *High frequency power (W)* | *For outward layer* | *225* | *165* | *115* | *70* | *300* |
| | | *High frequency power (W)* | *For inward layer* | *365* | *450* | *540* | *640* | *300* |
| | | Argon flow rate (sccm) | | 65 | 65 | 65 | 65 | 65 |
| | | Gas pressure (Pa) | | $2.5 \times 10^{-1}$ | $2.5 \times 10^{-1}$ | $2.5 \times 10^{-1}$ | $2.5 \times 10^{-1}$ | $2.5 \times 10^{-1}$ |
| | Deposition duration (min.) | | *For outward layer* | *163* | *159* | *155* | *153* | *165* |
| | | | *For inward layer* | *177* | *186* | *198* | *214* | *165* |
| Results of formation of negative electrode active material layers | *Film thickness (μm)* | | Outward layer | *5.8* | *5.6* | *5.4* | *5.3* | *6.2* |
| | | | Inward layer | *6.5* | *6.9* | *7.4* | *8.1* | *6.2* |
| | | | Thickness difference | *0.7* | *1.3* | *2.0* | *2.8* | *0* |
| | Fe concentration (at. %) | | Outward layer | *13.5* | *11.0* | *8.5* | *6.0* | *16.0* |
| | | | Inward layer | *18.5* | *21.0* | *23.5* | *26.0* | *16.0* |
| | | | Thickness difference | *5.0* | *10.0* | *15.0* | *20.0* | *0* |

Note: Varying values are indicated by bold italics.

As clearly seen from Table 3, it was observed that in each of Negative Electrodes a1 to a4 of the invention, the film thicknesses and Fe concentrations in the negative electrode active material layers were different between the inward layer and the outward layer, while in Comparative Negative Electrode x, the film thicknesses and Fe concentrations in the negative electrode active material layers were the same in both the inward layer and the outward layer.

It was also observed that in Negative Electrode a1 through Negative Electrode a4 of the invention, the film thicknesses of and Fe concentrations in the outward layers were in descending order from Negative Electrode a1 to Negative Electrode a4, while the film thicknesses of and Fe concentrations in the inward layers were in ascending order, from Negative Electrode a1 to Negative Electrode a4. In other words, in Negative Electrode a1 to Negative Electrode a4, the film thickness difference and Fe concentration difference between the outward layer and the inward layer are in ascending order from Negative Electrode a1 to Negative Electrode a4 of the invention.

Experiment 1

Cycle performance (i.e., the capacity retention ratio defined by Equation 1 below) was studied for each of Batteries A1 to A4 of the invention and Comparative Battery X. The results are shown in Table 4 below. The charge-discharge conditions were as set out below.

Capacity retention ratio(%)=(Discharge capacity at the 100th cycle)/(Discharge capacity at the first cycle)×100    Eq. (1)

Charge-Discharge Conditions

Charge Conditions

Each of the batteries is charged at a constant current of 1.0It (600 mA) until the battery voltage reaches 4.2 V.

Discharge Conditions

Each of the batteries is discharged at a constant current of 1.0It (600 mA) until the battery voltage reaches 2.75 V.

The charging and discharging are carried out at 25° C.

TABLE 4

| Battery | 1st cycle Discharge capacity (mAh) | 100th cycle Discharge capacity (mAh) | Capacity retention ratio (%) |
|---|---|---|---|
| A1 | 596 | 483 | 81 |
| A2 | 589 | 524 | 89 |
| A3 | 590 | 533 | 82 |
| A4 | 583 | 402 | 69 |
| Z | 601 | 328 | 55 |

As clearly seen from Table 4 above, Comparative Battery X, in which the iron concentrations are the same in both the outward negative electrode active material layer and the inward negative electrode active material layer, shows a capacity retention ratio at the 100th cycle (hereinafter simply referred to as a "capacity retention ratio") of low 55%. In contrast, Batteries A1 to A4 of the invention, in each of which the inward negative electrode active material layer has an iron concentration higher than the outward negative electrode active material layer, show high capacity retention ratios of 69% to 89%. Especially, Batteries A1 to A3 of the invention, in which the inward negative electrode active material layers have 5 atomic % to 15 atomic % higher iron concentrations than the outward negative electrode active material layers, exhibit remarkably high capacity retention ratios of 81% to 89%. This is believed to be due to the following reason.

In Comparative Battery X, the iron concentration in the outward negative electrode active material layer is identical to the iron concentration in the inward negative electrode active material layer (in other words, the concentrations of iron, which is not involved in the charge-discharge process, are the same in the outward layer and the inward layer). Therefore, Comparative Battery X cannot alleviate the stress to the inward layer, which is placed under a greater stress during charge and discharge, and consequently is unable to lessen the peel-off of the negative electrode active material due to the stress. In contrast, in Batteries A1 to A4 of the invention, the iron concentrations in their inward negative electrode active material layers are higher than the iron concentrations in their outward negative electrode active material layers. Therefore, Batteries A1 to A4 of the invention can alleviate the stress to the inward layer, which is placed under a greater stress during charge and discharge, and consequently they can minimize the peel-off of the negative electrode active material due to the stress. In particular, in Batteries A1 to A3 of the invention, the iron concentrations in their inward negative electrode active material layers are 5 atomic % to 15 atomic % higher than the iron concentrations in their outward negative electrode active material layers, and as a result, they sufficiently exhibit the effect of alleviating the stress.

Experiment 2

The thicknesses of Negative Electrodes a1 to a4 of the invention and Comparative Negative Electrode x before and after the charge-discharge test were measured with a micrometer to determine the amounts of thickness changes before and after the charge-discharge test. The results are shown in Table 5. It should be noted that, for each of the negative electrodes, the measurement was conducted at 10 points at regular intervals from one end to the other end along a longitudinal direction, and the average value obtained was taken as the negative electrode thickness for the electrode.

TABLE 5

| Negative electrode | Thickness before charge-discharge test (μm) | Thickness after charge-discharge test (μm) | Negative electrode thickness change (μm) |
|---|---|---|---|
| a1 | 37 | 123 | 86 |
| a2 | 37 | 130 | 93 |
| a3 | 37 | 119 | 82 |
| a4 | 38 | 153 | 115 |
| z | 36 | 209 | 173 |

As clearly seen from Table 5 above, it was observed that Comparative Negative Electrode x, in which the iron concentration in the outward negative electrode active material layer is identical to the iron concentration in the inward negative electrode active material layer, showed an amount of negative electrode thickness change before and after the charge-discharge test (hereafter simply referred to as "negative electrode thickness change") of large 173 μm. In contrast, Negative Electrodes a1 to a4 of the invention, in each of which the iron concentration in the inward negative electrode active material layer is higher than the iron concentration in the outward negative electrode active material layer, their negative electrode thickness changes were small 86 μm to 115 μm. In particular, Negative Electrodes a1 to a3 of the invention, in which the iron concentrations in the inward negative electrode active material layers were 5 atomic % to 15 atomic % higher than the iron concentrations in the outward negative electrode active material layers, showed remarkably small negative electrode thickness changes of 82 μm to 93 μm. This is believed to be due to the following reason.

In Comparative Negative Electrode x, the iron concentration in the outward negative electrode active material layer is identical to the iron concentration in the inward negative electrode active material layer. Therefore, Comparative Negative Electrode x cannot alleviate the stress to the inward layer, which is placed under a greater stress during charge and discharge, and consequently deformation such as creases occurs in the negative electrode active current collector. In contrast, in Negative Electrodes a1 to a4 of the invention, the iron concentrations in their inward negative electrode active material layers are higher than the iron concentrations in their outward negative electrode active material layers. Therefore, Negative Electrodes a1 to a4 of the invention can alleviate the stress to the inward layer, which is placed under a greater stress during charge and discharge, and consequently they can prevent the negative electrode active current collector from deformation such as creases. In particular, in Negative Electrodes a1 to a3 of the invention, the iron concentrations in their inward negative electrode active material layers are 5 atomic % to 15 atomic % higher than the iron concentrations in their outward negative electrode active material layers, and as a result, their effects of alleviating the stress are more significant.

Other Embodiments (1) The additive material to the negative electrode active material is not limited to iron, but may be other metals such as copper, nickel, titanium, cobalt, molybdenum, tungsten, and tantalum as well as alloys thereof.

(2) The negative electrode active material is not limited to silicon, but may be other materials that can intercalate lithium by being alloyed with lithium, such as germanium, tin, lead, zinc, magnesium, sodium, aluminum, potassium, and indium.

Figure 6:
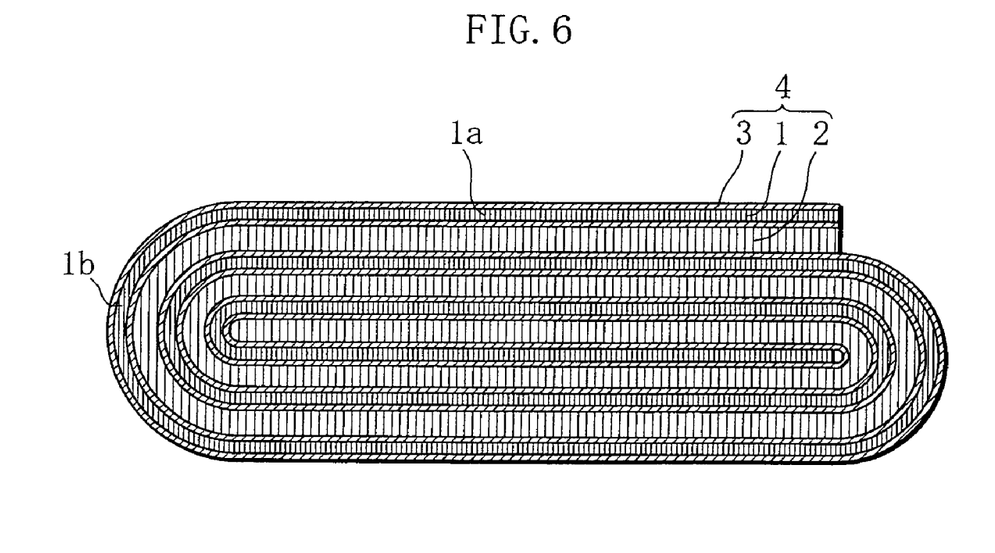
FIG. 6 is a cross-sectional view illustrating another example of the electrode assembly.
Figure 7:
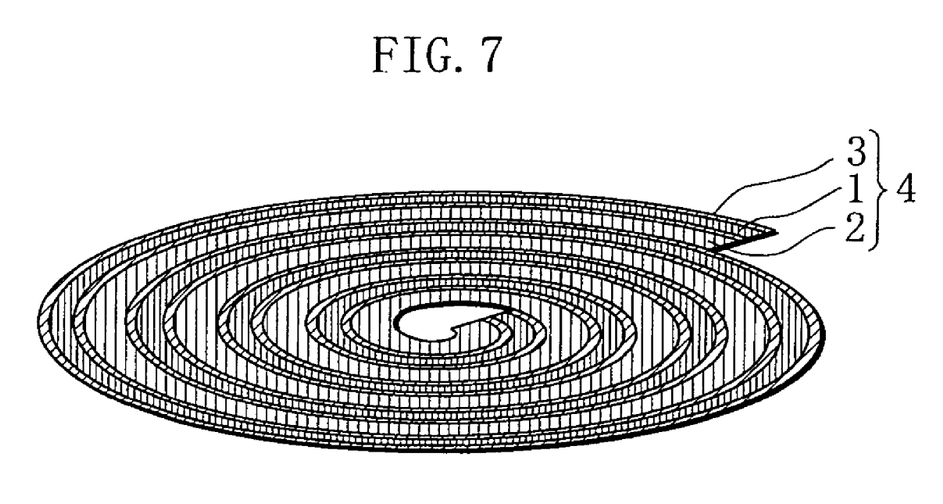
FIG. 7 is a cross-sectional view illustrating yet another example of the electrode assembly.

(3) The shape of the electrode assembly is not limited to the substantially circular cross-sectional shape (substantially columnar shape), but may be a substantially rectangular cross-sectional shape both ends of which are provided with curved portions, as illustrated in FIG. 6, or a substantially elliptic cross-sectional shape, as illustrated in FIG. 7. It should be noted that in the case of employing the configuration of the electrode assembly as shown in FIG. 6, in which the negative electrode 1 includes a flat portion 1a and curved portions 1b, it is sufficient that the inward negative electrode active material layer has a higher concentration of the additive metal at least in a curved portion 1b than the outward negative electrode active material layer. In the case of employing the electrode assembly configuration as shown in FIG. 7, the entire negative electrode is made up of the curved portion, but the curvature varies from one portion to another. In this case, for the portion with a small curvature (with a large radius of curvature), the concentration of the additive metal in the negative electrode active material layers should be varied only slightly between the inward layer and the outward layer. On the other hand, for the portion with a large curvature (with a small radius of curvature), the concentration of the additive metal in the negative electrode active material layers should be varied greatly between the inward layer and the outward layer.

(4) The positive electrode active material is not limited to lithium cobalt oxide, but may of course be other materials such as olivine-type lithium phosphate compound ($LiFePO_4$), spinel-type lithium manganese oxide ($LiMn_2O_4$), lithium-nickel composite oxide represented by lithium nickel oxide ($LiNiO_2$), lithium-transition metal composite oxide represented as $LiNi_xCo_yMn_zO_2$ where $x+y+z=1$, and other olivine-type phosphate compound, as well as mixtures thereof.

(5) The lithium salt in the electrolyte solution is not limited to $LiPF_6$, and various other substances may be used, including $LiBF_4$, $LiN(SO_2CF_3)_2$, $LiN(SO_2C_2F_5)_2$, $LiPF_{6-x}(C_nF_{2n+1})_x$ (wherein $1<x<6$ and $n=1$ or $2$), which may be used either alone or in combination. The concentration of the lithium salt is not particularly limited, but it is preferable that the concentration of the lithium salt be restricted in the range of from 0.8 moles to 1.5 moles per 1 liter of the electrolyte solution. The solvents for the electrolyte solution are not particularly limited to ethylene carbonate (EC) and diethyl carbonate (DEC) mentioned above, and preferable solvents include carbonate solvents such as propylene carbonate (PC), γ-butyrolactone (GBL), ethyl methyl carbonate (EMC), and dimethyl carbonate (DMC). More preferable is a combination of a cyclic carbonate and a chain carbonate.

(6) The present invention may be applied to gelled polymer batteries as well as liquid-type batteries. In this case, usable examples of the polymer material include polyether-based solid polymer, polycarbonate solid polymer, polyacrylonitrile-based solid polymer, oxetane-based polymer, epoxy-based polymer, and copolymers or cross-linked polymers comprising two or more of these polymers, as well as PVDF. Any of the above examples of polymer material may be used in combination with a lithium salt and an electrolyte to form a gelled solid electrolyte.

The present invention is applicable not only to driving power sources for mobile information terminals such as mobile telephones, notebook computers and PDAs but also to large-sized batteries for, for example, in-vehicle power sources for electric automobiles or hybrid automobiles.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A lithium secondary battery comprising:
   a negative electrode comprising a negative electrode current collector and negative electrode active material layers formed on respective surfaces of the negative electrode current collector, said negative electrode active material layers including a negative electrode active material layer disposed inward relative to the negative electrode current collector and another negative electrode active material layer disposed outward relative to the negative electrode current collector and each of the negative electrode active material layers comprising an alloy containing a negative electrode active material that intercalates and deintercalates lithium and an additive metal that does not intercalate or deintercalate lithium;
   a positive electrode;
   a separator interposed between the positive and negative electrodes; and
   an electrode assembly comprising the negative electrode, the positive electrode, and the separator, wherein:
   at least a portion of the electrode assembly has a curved portion, and in the curved portion, the inward negative electrode active material layer contains a higher concentration of the additive metal than the outward negative electrode active material layer,
   wherein the curved portion has a concentration difference of the additive metal of from 5 atomic % to 15 atomic % between the negative electrode active material layer disposed inward relative to the negative electrode current collector and the negative electrode active material layer disposed outward relative to the negative electrode current collector.

2. The lithium secondary battery according to claim 1, wherein the electrode assembly has a substantially circular cross-sectional shape.

3. The lithium secondary battery according to claim 1, wherein the electrode assembly has a substantially rectangular cross-sectional shape both ends of which having curved portions.

4. The lithium secondary battery according to claim 1, wherein the electrode assembly has a substantially elliptic cross-sectional shape.

5. The lithium secondary battery according to claim 1, wherein the additive metal is at least one metal selected from the group consisting of copper, nickel, iron, titanium, cobalt, molybdenum, tungsten, tantalum, and alloys thereof.

6. The lithium secondary battery according to claim 1, wherein the concentrations of the additive metal in the negative electrode active material are in a range of from 6 atomic % to 26 atomic %.

7. The lithium secondary battery according to claim 1, wherein the negative electrode active material contains silicon as its main component.

8. The lithium secondary battery according to claim 1, wherein each of the negative electrode active material layers a microcrystalline thin film or an amorphous thin film.

9. The lithium secondary battery according to claim 8, wherein each of the negative electrode active material layers is divided by gaps that form along its thickness to form columnar structures, and bottom portions of the columnar structures are in close contact with the negative electrode current collector.

10. The lithium secondary battery according to claim 8, wherein the negative electrode active material layers are formed by evaporation, sputtering, CVD, or thermal spraying.

11. The lithium secondary battery according to claim 1, wherein the respective surfaces of the negative electrode current collector on which the negative electrode active material layers are formed have been roughened.

12. The lithium secondary battery according to claim 11, wherein the respective surfaces of the negative electrode current collector are roughened by plating, vapor deposition, etching, or polishing.

13. The lithium secondary battery according to claim 12, wherein the negative electrode current collector is made of copper foil or a copper alloy foil, and the respective surfaces of the negative electrode current collector are roughened by a plating technique using a plating bath containing copper as its main component.

14. The lithium secondary battery according to claim 11, wherein the respective surfaces of the negative electrode current collector on which the negative electrode active material layers are formed have a surface roughness (Ra) of 0.01 μm to 2 μm.

15. The lithium secondary battery according to claim 1, wherein the negative electrode current collector is made of a foil containing a heat-resistant copper alloy.

* * * * *